(12) United States Patent
Pautis et al.

(10) Patent No.: US 10,556,699 B2
(45) Date of Patent: Feb. 11, 2020

(54) AIRCRAFT ENGINE ASSEMBLY COMPRISING A PYLON LEADING EDGE INCORPORATED WITH AN ANNULAR ROW OF UNFAIRED AFTER-GUIDE VANES

(71) Applicant: Airbus Operations SAS, Toulouse (FR)

(72) Inventors: Olivier Pautis, Merville (FR); Jerome Colmagro, Toulouse (FR); David Ewens, Merville (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 353 days.

(21) Appl. No.: 15/496,183

(22) Filed: Apr. 25, 2017

(65) Prior Publication Data

US 2017/0313430 A1 Nov. 2, 2017

(30) Foreign Application Priority Data

Apr. 28, 2016 (FR) ...................... 16 53814

(51) Int. Cl.
| | |
|---|---|
| *B64D 27/14* | (2006.01) |
| *B64D 27/20* | (2006.01) |
| *B64D 27/26* | (2006.01) |
| *B64C 11/30* | (2006.01) |
| *B64D 27/12* | (2006.01) |
| *B64D 27/00* | (2006.01) |

(52) U.S. Cl.
CPC .............. *B64D 27/12* (2013.01); *B64C 11/30* (2013.01); *B64D 27/14* (2013.01); *B64D 27/20* (2013.01); *B64D 2027/005* (2013.01); *B64D 2027/262* (2013.01)

(58) Field of Classification Search
CPC ........ B64D 27/06; B64D 27/10; B64D 27/12; B64D 27/14; B64D 27/16; B64D 27/18; B64D 27/20; B64D 27/26; B64D 29/02; B64D 2027/005; B64D 2027/262; B64C 11/30
USPC ................... 244/55; 60/796, 797, 39.34, 204
See application file for complete search history.

(56) References Cited

U.S. PATENT DOCUMENTS

| | | | |
|---|---|---|---|
| 4,486,146 A | 12/1984 | Campton | |
| 4,917,336 A * | 4/1990 | Jacobs | B64C 23/00 244/130 |
| 4,966,338 A * | 10/1990 | Gordon | B64C 23/06 244/130 |

(Continued)

FOREIGN PATENT DOCUMENTS

| | | | | |
|---|---|---|---|---|
| FR | 2979391 A1 * | 3/2013 | ............. | F02K 3/025 |
| FR | 3024125 | 1/2016 | | |

OTHER PUBLICATIONS

French Search Report, dated Jan. 10, 2017, priority document.

*Primary Examiner* — James S Bergin
(74) *Attorney, Agent, or Firm* — Greer, Burns & Crain, Ltd.

(57) ABSTRACT

To reduce the overall mass of an engine assembly for aircraft, this assembly comprises a part of the fuselage of an aircraft, a turbomachine comprising an unfaired propeller, together with an annular row of unfaired after-guide vanes located aft of the propeller and rotationally fixed in relation to a longitudinal axis of the turbomachine, and a mounting pylon. At least part of the leading edge of the pylon is incorporated within the annular row between two after-guide vanes.

14 Claims, 4 Drawing Sheets

(56) References Cited

U.S. PATENT DOCUMENTS

| | | | |
|---|---|---|---|
| 4,976,102 A * | 12/1990 | Taylor | B64C 11/48 416/129 |
| 5,156,353 A * | 10/1992 | Gliebe | B64C 21/025 244/130 |
| 5,443,229 A * | 8/1995 | O'Brien | B64D 27/20 244/54 |
| 8,011,613 B2 * | 9/2011 | Belleville | B64D 27/14 244/1 N |
| 8,256,709 B2 * | 9/2012 | Negulescu | B64D 27/08 244/54 |
| 8,313,055 B2 * | 11/2012 | Gall | B64D 27/02 244/1 N |
| 8,438,829 B2 * | 5/2013 | Negulescu | B64D 27/10 244/69 |
| 8,579,230 B2 * | 11/2013 | Diochon | B64D 29/04 244/54 |
| 8,622,340 B2 * | 1/2014 | Bensilum | B64D 27/14 137/15.1 |
| 8,714,475 B2 * | 5/2014 | Gall | B64C 3/54 244/1 N |
| 8,714,477 B2 * | 5/2014 | Rinjonneau | B64D 33/10 165/41 |
| 8,720,815 B2 * | 5/2014 | Vetters | B64D 27/10 244/54 |
| 8,740,138 B2 * | 6/2014 | Sanz Martinez | B64D 27/14 244/54 |
| 8,960,603 B2 * | 2/2015 | Santolalla | B64C 1/061 244/119 |
| 9,085,372 B2 * | 7/2015 | Saucray | B64D 31/12 |
| 9,091,207 B2 * | 7/2015 | Chanez | F02C 7/05 |
| 9,242,721 B2 * | 1/2016 | Neuteboom | B64C 11/48 |
| 9,346,551 B2 * | 5/2016 | Stretton | B64D 27/14 |
| 9,573,693 B2 * | 2/2017 | Cazals | B64C 39/12 |
| 9,701,395 B2 * | 7/2017 | Veilleux, Jr. | B64C 11/48 |
| 9,902,501 B2 * | 2/2018 | Guillemaut | B64C 11/001 |
| 10,232,930 B2 * | 3/2019 | Pautis | B64D 29/08 |
| 2013/0315701 A1 | 11/2013 | Neuteboom | |
| 2016/0010487 A1 | 1/2016 | Breeze-Stringfellow et al. | |
| 2017/0088276 A1 * | 3/2017 | Gruber | B64D 29/06 |
| 2018/0065727 A1 * | 3/2018 | Gruber | B64C 1/16 |

* cited by examiner

AIRCRAFT ENGINE ASSEMBLY COMPRISING A PYLON LEADING EDGE INCORPORATED WITH AN ANNULAR ROW OF UNFAIRED AFTER-GUIDE VANES

CROSS-REFERENCES TO RELATED APPLICATIONS

This application claims the benefit of the French patent application No. 1653814 filed on Apr. 28, 2016, the entire disclosures of which are incorporated herein by way of reference.

TECHNICAL FIELD

This invention relates to the field of engine assemblies comprising a turbomachine attached to a part of a fuselage through a pylon mounting. It relates more preferably to designs in which the turbomachine is attached to the side of the rear fuselage.

BACKGROUND OF THE INVENTION

In the prior art, it is known that turbomachines can be attached to the side of the rear fuselage of an aircraft, these turbomachines having a pair of contrarotating unfaired propellers, also referred to as of the "Open Rotor" type, or again "CROR" (Contra Rotative Open Rotor). These turbomachines are, for example, known from document FR 3 024 125.

In the so-called "Puller" configuration, in which the propellers are located forward of the turbomachine's gas generator, a minimum axial distance is provided between the trailing edge of the blades of the after propeller and the leading edge of the mounting pylon. This minimum distance, which is, for example, of the order of a meter, in particular, makes it possible to limit the risks of detachment of the boundary layer from the after-propeller blades.

However, provision of this minimum distance gives rise to consequent cantilevering of the turbomachine on the mounting pylon. The existence of this cantilevering means that the pylon and the part of the fuselage supporting the pylon must be appropriately dimensioned, with the consequence that the assembly has a large overall mass.

SUMMARY OF THE INVENTION

In order to provide at least a partial response to this problem, the invention relates to an aircraft engine assembly comprising:
  a part of an aircraft's fuselage;
  a turbomachine comprising an unfaired propeller, as well as an annular row of unfaired after-guide vanes located aft of the propeller and rotationally fixed in relation to a longitudinal axis of the turbomachine; and
  a pylon mounting between the turbomachine and the part of the fuselage, the pylon incorporating a leading edge of the pylon.

According to the invention, at least part of the leading edge of the pylon is incorporated within the annular row, between two after-guide vanes thereof.

As a result of the turbomachine being moved aft until the leading edge of the pylon is incorporated in the annular row of after-guide vanes, cantilevering of the turbomachine is considerably reduced. The pylon and the part of the fuselage in question are then advantageously under less load, which means that their dimensions can be reduced and thus a considerably lower overall mass can be achieved for the engine assembly.

The invention preferably incorporates at least one of the following optional characteristics, taken alone or in combination.

A forward extremity of the at least one part of the leading edge of the pylon is located in an imaginary plane P2 passing through the leading edges of the after-guide vanes.

The mounting pylon comprises a main structure located aft of the leading edge of the pylon, the main structure connecting the part of the fuselage to the turbomachine. This main structure is of slender shape, such as the overall shape of a rectangular box, and constitutes the main path for forces between the engine and the fuselage. Conventionally it is constructed using side panels, upper and lower longitudinal members and internal ribs.

According to a preferred embodiment of the invention, the leading edge of the pylon is fixed in relation to the main structure of the pylon.

According to another preferred embodiment of the invention, the at least part of the leading edge of the pylon can rotate in relation to the main structure of the pylon along a pivot axis which is substantially parallel to the wingspan direction of the pylon's leading edge.

It is then preferably provided that the at least part of the leading edge of the pylon is connected to a pitch control device for the after-guide vanes, the device being designed to vary the pitch of the at least part of the leading edge of the pylon, causing it to pivot about the pivot axis.

Preferably the pivot axis is located in the same imaginary plane as that which includes the radial axes of the after-guide vanes, radial axes on the basis of which the after-guide vanes are designed so that their pitch can be pivoted by the pitch control device.

Preferably the at least part of the leading edge of the pylon has a transverse cross-section of generally concave shape, preferably of a general shape substantially identical to that of the transverse cross-section of the after-guide vanes.

According to a preferred embodiment of the invention, the leading edge extends in a substantially straight manner between the turbomachine and the part of the fuselage.

According to another preferred embodiment of the invention, the leading edge of the pylon has a portion which is rounded forwards forming the at least one part of the leading edge of the pylon incorporated within the annular row of after-guide vanes, the rounded portion extending from the turbomachine to the part of the fuselage and being extended by a junction portion with that part of the fuselage, the rounded part preferably having an edge of a shape which is substantially identical to a leading edge of the after-guide vanes.

Preferably the junction portion of the leading edge of the pylon is substantially straight.

Preferably the turbomachine comprises a gas generator located aft of the propeller. Furthermore, the part of the fuselage is preferably a rear side portion of that fuselage.

As mentioned above, the turbomachine also comprises a pitch control device for the after-guide vanes, this pitch control device being also designed to vary the pitch of the unfaired propeller blades, causing them to pivot along radial axes of the blades. Alternatively, it may comprise two separate pitch control devices controlled in a synchronous manner.

Finally, the invention also relates to an aircraft comprising at least one engine assembly as described above.

Other advantages and characteristics of the invention will be apparent from the non-limiting detailed description below.

BRIEF DESCRIPTION OF THE DRAWINGS

This description will be provided with reference to the appended drawings, of which.

DETAILED DESCRIPTION OF THE PREFERRED EMBODIMENTS

Figure 1:
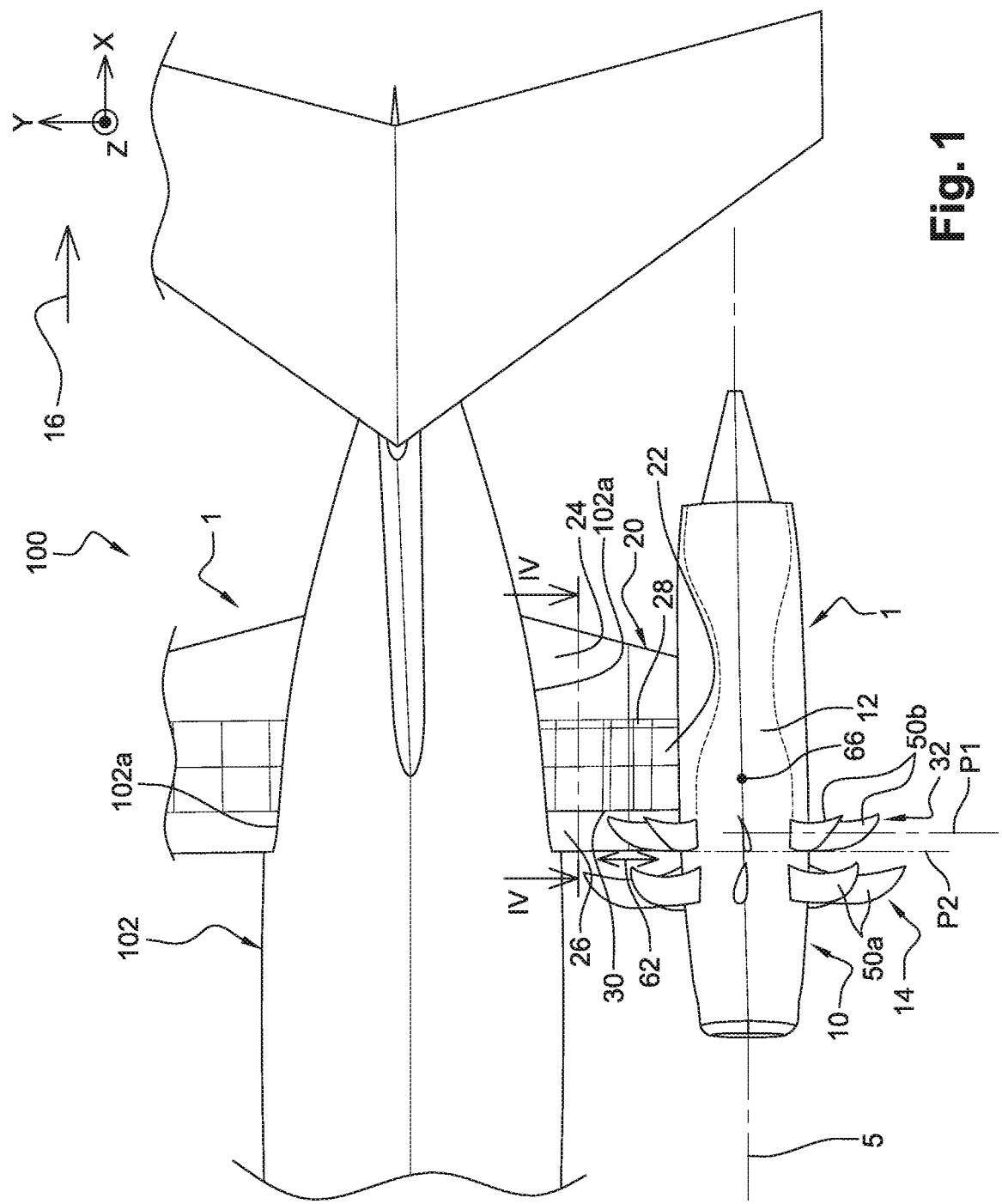
FIG. 1 shows a diagrammatical view from above of a part of an aircraft comprising an engine assembly according to a first preferred embodiment of the invention.

With reference first of all to FIG. 1, this shows an after-part of an aircraft 100 comprising one or more engine assemblies 1 according to a first preferred embodiment of the invention. More specifically, aircraft 100 comprises two engine assemblies 1 (only one being shown in full in FIG. 1), each thus being located in the after-part of the aircraft Each engine assembly 1 comprises an after-lateral-part 102a of a fuselage 102. It also comprises a turbomachine 10 equipped with a single unfaired propeller 14 in "Puller" mode, that is to say, it comprises a gas generator 12 located aft of propeller 14. In this respect, it should be noted that throughout the description the terms "fore" and "aft" are to be considered with reference to a main direction in which the gases flow through turbomachines 10, this direction being illustrated diagrammatically by arrow 16. Furthermore, by convention, the X direction corresponds to the longitudinal direction of engine assembly 1, which can also coincide with the longitudinal direction of turbomachine 10 and the assembly 1. This X direction is parallel to a longitudinal axis 5 of turbomachine 10. In addition to this the Y direction corresponds to the direction orientated transversely with respect to engine assembly 1 which can also coincide with the transverse direction of turbomachine 10, while the Z direction corresponds to the vertical or height direction. These three directions X, Y and Z are at right angles to each other and form a right trihedron.

Engine assembly 1 also comprises a mounting pylon 20 for the turbomachine on part of fuselage 102a. Pylon 20, also known as an EMS (Engine Mounting Structure) comprises a main structure in the form of a box 22 intended to take up the forces originating from the turbomachine. This box 22 is, in particular, constructed with an after-longitudinal-member 28 from which there extends aft a trailing edge of pylon 24, and with a forward-longitudinal-member 30 from which the leading edge of pylon 26 extends forward.

Viewed from above, box 22 extends in the Y direction, from turbomachine 10 to part of fuselage 102a.

Returning to turbomachine 10 illustrated in FIG. 1, it will be noted that this has as single propeller 14 rotating about shaft 5, and not two contrarotating propellers as in the case of turbomachines of the more conventional Open Rotor type. Turbomachine 10 is also called a USF (Unducted Single Fan). Nevertheless, it comprises an annular row 32 of unfaired after-guide vanes aft of propeller 14. This annular row 32 is therefore not mounted so as to rotate relative to shaft 5, but is rotationally fixed in relation to the latter.

Figure 2:
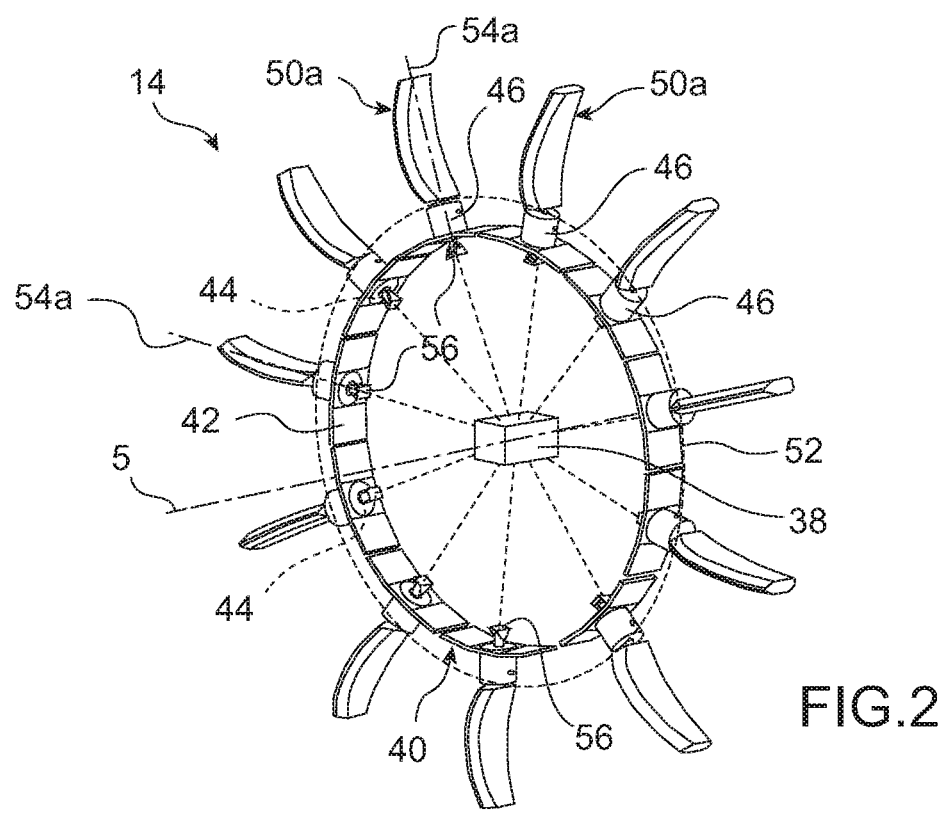
FIG. 2 shows a perspective view of the propeller fitted to the engine assembly shown in the above figure.
Figure 3:
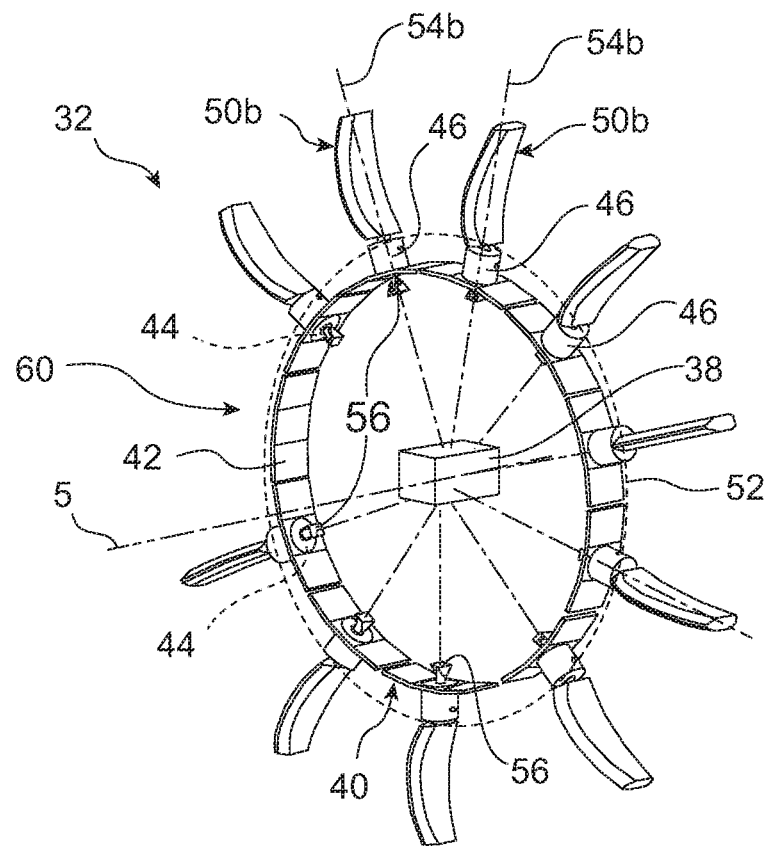
FIG. 3 shows a perspective view of the row of annular after-guide vanes with which the engine assembly shown in FIG. 1 is provided.

With reference to FIGS. 2 and 3, the turbomachine comprises a pitch control device 38 which makes it possible to vary the pitch of both blades 50a of propeller 14 about their radial axes 54a, and the after-guide vanes 50b of fixed annular row 32, also about their radial axes 54b.

In FIG. 2 illustrating propeller 14, the latter has a hub 40 centered on the axis of rotation of the propeller, corresponding to axis 5. This hub 40 comprises a main ring 42 centered on shaft 5, pierced by several openings 44 spaced circumferentially apart from each other and radially orientated in relation to the axis 5. Hub 40 also comprises hollow members 46 associated with openings 44 and extending radially outwards from main ring 42. Each hollow member 46 is centered on one of radial axes 54a and is intended to receive a propeller blade 50a. In addition to this, the propeller comprises an outer cowling 52 which is only shown diagrammatically in FIG. 2, the cowling 52 being centered on shaft 5 and arranged around hollow members 46. In a conventional way, the outer surface of the cowling 52 is intended to be followed by the air circulating around the turbomachine before it reaches the propeller blades.

Propeller 14 thus comprises a plurality of blades 50a, provided in a number of, for example, between 8 and 12. Base 56 of each blade 50a projects radially towards the interior of hub 40 in such a way that it can be mechanically connected to pitch control device 38 in a conventional way.

Annular row 32 shown in FIG. 3 may have a design which is identical or similar to that of propeller 14. As a consequence, in FIGS. 2 and 3, elements bearing the same numerical reference numbers correspond to identical or similar elements. One difference nevertheless lies in the fact that hub 40 does not rotate relative to shaft 5. Furthermore, one of the special features of the invention lies in the fact that annular row 32 has an open space 60 between two blades 50b to incorporate at least part of the leading edge of the pylon.

In fact, returning to FIG. 1, it will be noted that the leading edge of pylon 26 is incorporated in annular row 32, between two directly consecutive guide vanes.

In the first embodiment illustrated in FIGS. 1 to 4a, it is the whole of the leading edge of pylon 26 which is incorporated in annular row 32. The leading edge of pylon 26 is here fixed in relation to box 22 and has a conventional cross-section of an aerodynamic profile, similar to that of an aircraft wing. Furthermore, it extends substantially straight in wingspan direction 62 between turbomachine 10 and part of fuselage 102a.

In this first preferred embodiment, the leading edge of pylon 26 is considered to be wholly incorporated in annular row 32, because an imaginary plane P1 passing through the radial axes of after-guide vanes 50b passes through its entire length.

Furthermore, a forward extremity of the leading edge of pylon 26 is located in an imaginary plane P2 passing through the leading edges of after-guide vanes 50b, this plane P2 being substantially at right angles to axis 5. Even more preferably the forward extremity of the leading edge of pylon 26 is located in the same imaginary transverse plane as the forward extremity of the leading edge of after-guide vanes 50*b*.

The invention is thus worthy of note in that it makes it possible to move the center of gravity of the turbomachine, identified as 66 in FIG. 1, closer to box 22 of mounting pylon 20. This makes it possible to reduce the cantilevering of the turbomachine, and therefore to reduce the forces passing through pylon 20 and part of fuselage 102*a*. The mass of engine assembly 1 is as a result advantageously reduced. Preferably center of gravity 66 is located in an extension of box 22, outwards in wingspan direction 62.

Furthermore, as the turbomachine is moved very much further aft in comparison with known embodiments in the prior art, it follows that the section of the fuselage which is exposed to noise nuisances caused by the turbomachine is reduced. Likewise, the design according to the invention implies that there are no longer any harmful interactions between the air flow leaving after-guide vanes 50*b* and the leading edge of pylon 26. This advantageously makes it possible to increase the aerodynamic performance and the overall performance of engine assembly 1.

Figure 4A:
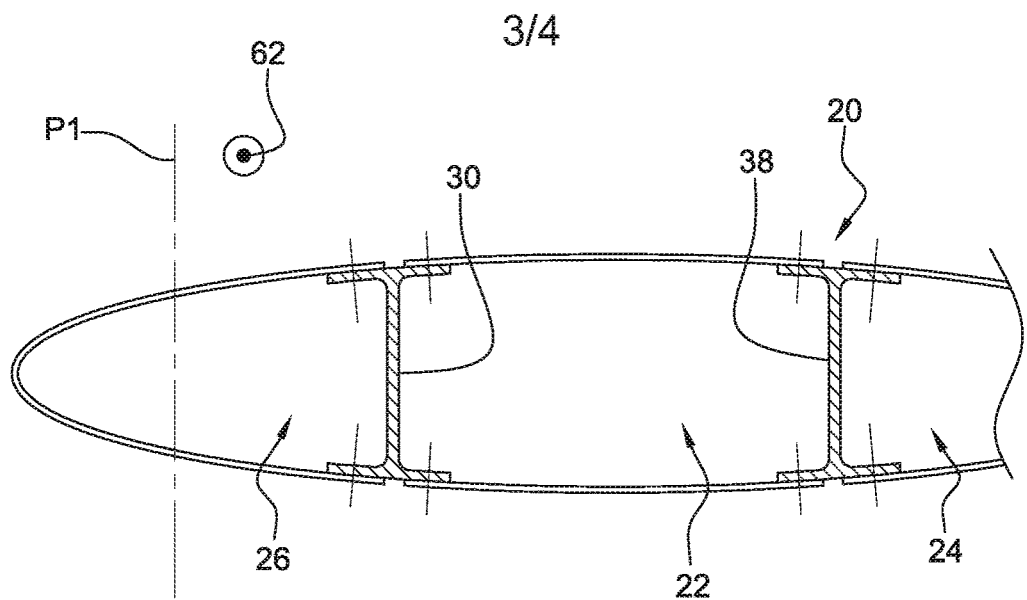
FIG. 4a shows a view in cross-section along the line IV-IV in FIG. 1.
Figure 4B:
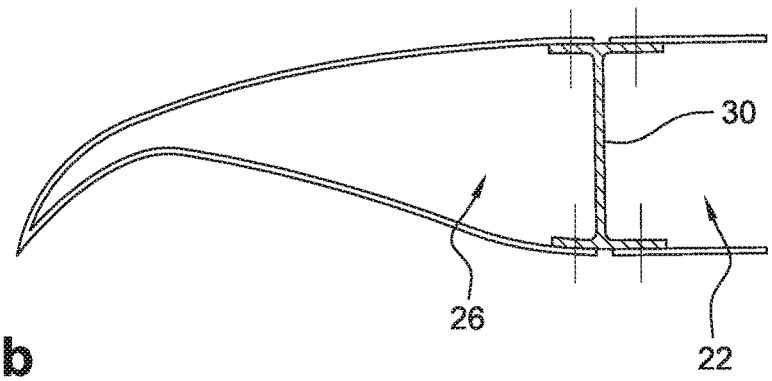
FIG. 4b is a view similar to that in the previous figure, with the leading edge in the form of another embodiment of the invention.

According to a second preferred embodiment illustrated in FIG. 4*b* the leading edge of pylon 26 is no longer of a conventional shape, but its transverse cross-section is of a generally concave shape, with the concavity orientated in the same direction as vanes 50*b*. Furthermore, it is preferably arranged that the transverse cross-section of leading edge 26 has a shape which is generally substantially identical to that of the transverse cross-section of these after-guide vanes 50*b*, so that the leading edge of pylon 26 is better incorporated within annular row 32.

Figure 4C:
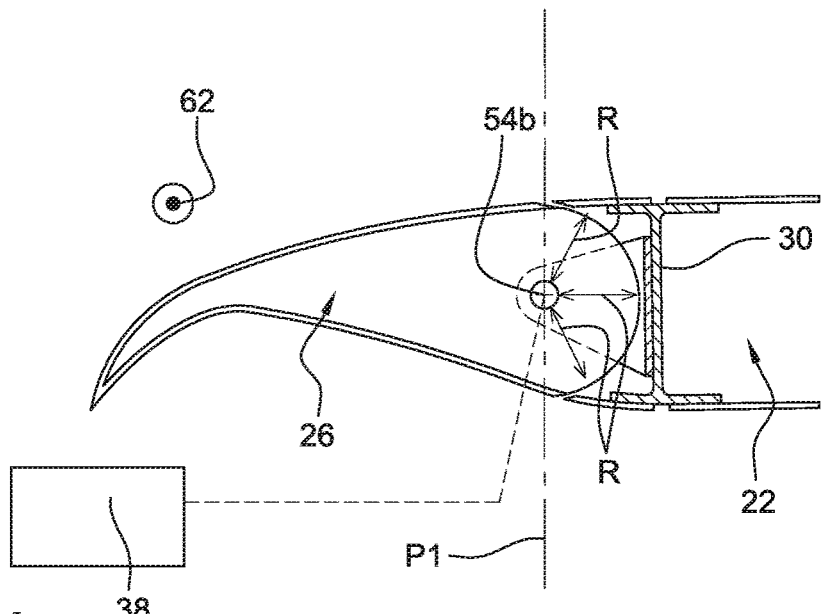
FIG. 4c is a view similar to that in FIG. 4b, with the leading edge of the pylon in the form of another preferred embodiment of the invention.

According to a third preferred embodiment illustrated in FIG. 4*c* the shape of the leading edge of pylon 26 is retained, but this is made to be able to rotate in relation to box 22 about a pivot axis 54*b* which is substantially parallel to wingspan direction 62. As a consequence, leading edge 26 can be considered similar to an after-guide vane, and its pitch can be controlled in the same way as the other vanes in the annular row by means of control device 38 to which it is connected mechanically.

In the case in point it is preferably provided that pivot axis 54*b* for the leading edge of pylon 26 is located in the same imaginary plane P1 as that containing radial axes 54*b* of after-guide vanes 50*b* shown in FIG. 3.

Figure 5:
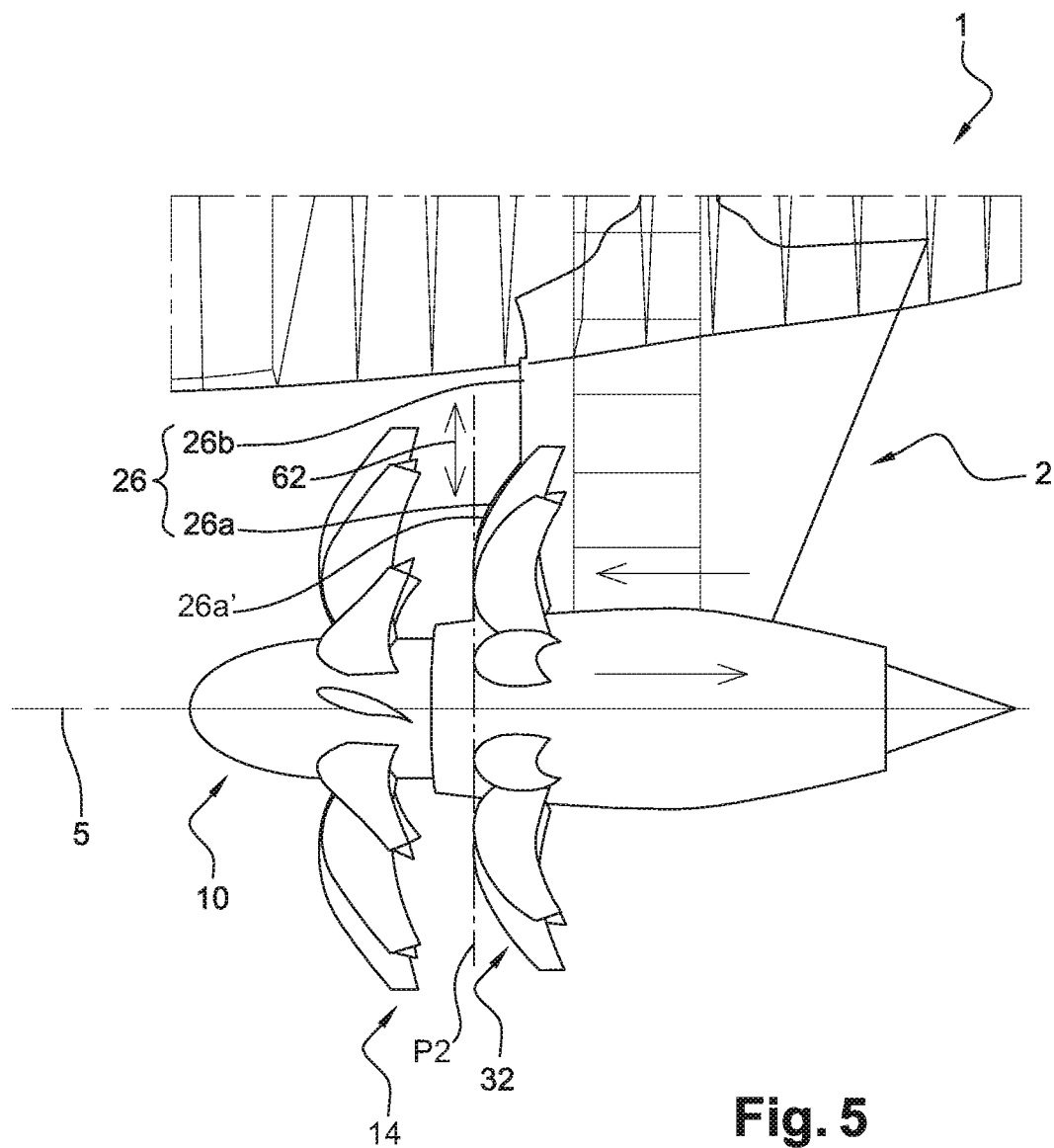
FIG. 5 shows a view similar to that in FIG. 1, with the leading edge of the pylon in the form of yet another preferred embodiment of the invention.

Finally, FIG. 5 shows a fourth preferred embodiment of the invention in which only a part 26*a* of the leading edge of pylon 26 is incorporated in annular row 32. This is a portion 26*a* that is rounded forwards in the manner of the leading edge of an after-guide vane. This rounded portion 26*a* extends from turbomachine 10 towards the part of the fuselage over a radial length which is substantially identical to that of after-guide vanes 50*b*. Furthermore, rounded portion 26*a* has a forward edge 26*a*', which can be considered to be like its leading edge, whose shape is substantially identical to that of a leading edge of after-guide vanes 50*b*.

Rounded portion 26*a* is extended by a junction portion 26*b* with part of fuselage 102*a*, this junction portion 26*b* being substantially straight and parallel to wingspan direction 62.

Here again the forward extremity of edge 26*a*' lies in imaginary transverse plane P2 passing through the leading edges of after-guide vanes 50*b*, and more preferably imaginary transverse plane P2 passes through the forward extremity of the leading edges of after-guide vanes 50*b*.

Of course, various modifications may be made by those skilled in the art to the invention which has just been described purely by way of non-limiting examples. In particular, the embodiments which have been described above are not exclusive for each other, but may on the contrary be combined together.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An engine assembly for aircraft comprising:
a part of the fuselage of an aircraft;
a turbomachine comprising an unfaired propeller, together with an annular row of unfaired after-guide vanes located aft of the propeller and rotationally fixed in relation to a longitudinal axis of the turbomachine; and
a pylon for mounting the turbomachine on part of the fuselage, the pylon incorporating a leading edge of the pylon,
wherein at least part of the leading edge of the pylon is incorporated within the annular row between two after-guide vanes thereof.

2. The engine assembly according to claim 1, wherein the forward extremity of the at least one part of the leading edge of the pylon lies in an imaginary plane passing through leading edges of the after-guide vanes.

3. The engine assembly according to claim 1, wherein the leading edge of the pylon is fixed with respect to a main structure of the pylon.

4. The engine assembly according to claim 1, wherein the at least part of the leading edge of the pylon can rotate in relation to a main structure of the pylon about a pivot axis substantially parallel to a wingspan direction of the leading edge of the pylon.

5. The engine assembly according to claim 4, wherein the at least part of the leading edge of the pylon is connected to a pitch control device for the after-guide vanes, the device being designed so as to vary the pitch of the at least part of the leading edge of the pylon causing it to pivot about the pivot axis.

6. The engine assembly according to claim 4, wherein the pivot axis is located in the same imaginary plane as that including radial axes of the after-guide vanes, radial axes on the basis of which the after-guide vanes are configured so that their pitch can be pivoted by the pitch control device.

7. The engine assembly according to claim 1, wherein the at least part of the leading edge of the pylon has a transverse cross-section of a generally concave shape, and a general shape which is substantially identical to that of a transverse cross-section of the after-guide vanes.

8. The engine assembly according to claim 1, wherein the leading edge of the pylon extends in a substantially straight manner between the turbomachine and the part of the fuselage.

9. The engine assembly according to claim 1, wherein the leading edge of the pylon has a portion which is rounded forwards forming the at least part of the leading edge of the pylon which is incorporated within the annular row of after-guide vanes, the rounded portion extending from the turbomachine towards the part of the fuselage and being extended by a junction portion with that part of the fuselage, the rounded portion preferably having a forward edge of a shape which is substantially identical to a leading edge of the after-guide vanes.

10. The engine assembly according to claim 9, wherein the junction portion of the leading edge of the pylon is substantially straight.

11. The engine assembly according to claim 1, wherein the turbomachine comprises a gas generator located aft of the propeller.

12. The engine assembly according to claim 1, wherein the part of the fuselage is a rear side part of that fuselage.

13. The engine assembly according to claim 1, wherein the turbomachine also comprises a pitch control device for the after-guide vanes, the pitch control device being also configured to vary the pitch of the blades of the unfaired propeller by causing them to pivot about the radial axes of those blades.

14. An aircraft comprising at least one engine assembly according to claim 1.

\* \* \* \* \*